(12) United States Patent
Ford et al.

(10) Patent No.: US 8,057,693 B1
(45) Date of Patent: Nov. 15, 2011

(54) COMPOSITIONS AND METHODS FOR IMPARTING LIQUID REPELLENCY AND DRY SOIL RESISTANCE TO FIBERS AND ARTICLES THEREOF

(75) Inventors: Geary Charles Ford, Calhoun, GA (US); James K. Calhoun, Jr., Chatsworth, GA (US); James R. Bartley, Ooltewah, TN (US)

(73) Assignee: Arrowstar, LLC, Dalton, GA (US)

( * ) Notice: Subject to any disclaimer, the term of this patent is extended or adjusted under 35 U.S.C. 154(b) by 0 days.

(21) Appl. No.: 12/843,331

(22) Filed: Jul. 26, 2010

(51) Int. Cl.
*D06M 15/643* (2006.01)
*D06M 15/00* (2006.01)
*C09D 191/06* (2006.01)
*C09K 3/18* (2006.01)

(52) U.S. Cl. ............... 252/8.62; 106/287.1; 106/287.13; 106/287.14; 106/287.15; 106/270; 106/271; 106/272; 252/8.61; 252/8.81; 252/8.91; 427/387; 428/391; 428/447

(58) Field of Classification Search ............... 106/287.1, 106/287.13, 287.14, 287.15, 270, 271, 272; 252/8.61, 8.81, 8.91, 8.62; 427/387; 428/391, 428/447
See application file for complete search history.

(56) References Cited

U.S. PATENT DOCUMENTS

| | | | |
|---|---|---|---|
| 3,493,424 A | 2/1970 | Lansing et al. | |
| 4,329,390 A | 5/1982 | Danner | |
| 4,351,736 A | 9/1982 | Steinberger et al. | |
| 4,781,844 A | 11/1988 | Kortmann et al. | |
| 5,073,442 A | 12/1991 | Knowlton et al. | |
| 5,209,775 A | 5/1993 | Bank et al. | |
| 5,888,290 A | 3/1999 | Engle et al. | |
| 5,908,663 A | 6/1999 | Wang et al. | |
| 6,323,268 B1 | 11/2001 | Fisher et al. | |
| 6,579,923 B2 | 6/2003 | Yarmey et al. | |
| 6,736,857 B2 | 5/2004 | Chang et al. | |
| 6,750,277 B1 | 6/2004 | Yamana et al. | |
| 7,015,278 B2 | 3/2006 | Trombetta et al. | |
| 7,320,956 B2 | 1/2008 | Johnson et al. | |
| 7,425,279 B2 | 9/2008 | Cote et al. | |
| 7,485,588 B2 | 2/2009 | Wang et al. | |
| 7,700,159 B2 | 4/2010 | Yonei et al. | |
| 2004/0180011 A1* | 9/2004 | Schlosser | 424/64 |
| 2005/0164010 A1 | 7/2005 | Trombetta | |
| 2008/0102050 A1* | 5/2008 | Li et al. | 424/70.12 |
| 2008/0305067 A1* | 12/2008 | Bui et al. | 424/78.02 |

FOREIGN PATENT DOCUMENTS

| | | | |
|---|---|---|---|
| DE | 1014682 A1 * | 3/2003 | |
| EP | 1040821 A * | 10/2000 | |
| GB | 1185957 | 4/1970 | |
| GB | 2432163 | 5/2007 | |
| JP | 2004-091459 * | 3/2004 | |

* cited by examiner

*Primary Examiner* — Anthony Green
(74) *Attorney, Agent, or Firm* — Gardner Groff Greenwald & Villanueva, PC

(57) ABSTRACT

Described herein are compositions and methods for imparting liquid repellency and dry soil resistance to fibers. The compositions are composed of (a) a silsesquioxane, (b) a wax, (c) a surfactant, and (b) water. Also disclosed are kits comprising (a) a first aqueous composition comprising a silsesquioxane and a first surfactant and (b) a second aqueous composition comprising a wax and a second surfactant. Finally, fibers and articles treated with the compositions and methods described herein are provided.

24 Claims, No Drawings

COMPOSITIONS AND METHODS FOR IMPARTING LIQUID REPELLENCY AND DRY SOIL RESISTANCE TO FIBERS AND ARTICLES THEREOF

BACKGROUND

Carpet is generally exposed to a number of different substances that can stain and ultimately diminish the appearance of carpet. The substances can be hydrophilic and/or hydrophobic in nature. Although individual formulations exist for repelling water- and oil-based materials, it would be desirable to have a formulation that additionally repels soil to prolong the appearance and durability of carpet and other related fibers. It would also be desirable to have a formulation that does not present environmental concerns when applied to fibers typically exposed to liquids and solid contaminants. The compositions and methods described herein address these needs.

SUMMARY

Described herein are compositions and methods for imparting liquid repellency and dry soil resistance to fibers. The compositions are composed of (a) a silsesquioxane, (b) a wax, (c) a surfactant, and (b) water. Also disclosed are kits comprising (a) a first aqueous composition comprising a silsesquioxane and a first surfactant and (b) a second aqueous composition comprising a wax and a second surfactant. Finally, fibers and articles treated with the compositions and methods described herein are provided. Additional advantages of the compositions, methods, and articles described herein will be set forth in part in the description that follows, and in part will be apparent from the description. The advantages of the compositions, methods, and articles described herein will be realized and attained by means of the elements and combination particularly pointed out in the appended claims. It is to be understood that both the foregoing general description and the following detailed description are exemplary and explanatory only and are not restrictive of the compositions, methods, and articles described herein, as claimed.

DETAILED DESCRIPTION

The compositions, methods, and articles described herein can be understood more readily by reference to the following detailed description. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "a wax" includes mixtures of two or more waxes.

The term "alkyl" refers to, unless stated otherwise, straight or branched hydrocarbon radicals, such as methyl, ethyl, propyl, butyl, octyl, isopropyl, tert-butyl, sec-pentyl, and the like. Alkyl groups can either be unsubstituted or substituted with one or more substituents, e.g., halogen, alkoxy, aryl, arylalkyl, aralkoxy and the like. Alkyl groups include, for example, 1 to 25 carbon atoms, 1 to 8 carbon atoms, or 1 to 4 to carbon atoms.

The term "liquid repellency" is defined herein as the ability of an article to avoid penetration of a liquid into the article. The liquid can include water, solvents, or hydrophobic (i.e., oil-based) materials.

The term "dry soil resistance" as used herein is the ability to prevent dry soils from sticking to a substrate such as a fiber. For example, the dry soil can be dirt tracked in by foot traffic.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed that while specific reference of each various individual and collective combination and permutation of these compounds may not be explicitly disclosed, each is specifically contemplated and described herein. For example, if a silsesquioxane is disclosed and discussed and a number of different waxes are discussed, each and every combination and permutation of silsesquioxane and wax that are possible are specifically contemplated unless specifically indicated to the contrary. For example, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Throughout this application, where publications are referenced, the disclosures of these publications in their entireties are hereby incorporated by reference into this application in order to more fully describe the state of the art to which this invention pertains.

Described herein are compositions and methods for imparting liquid repellency and dry soil resistance to fibers. The compositions are composed of (a) a silsesquioxane, (b) a wax, (c) a surfactant, and (b) water. Each component is described in detail below as well as methods of making and using the compositions.

The silsesquioxanes useful herein have the general formula R—$SiO_{3/2}$ and/or R—$Si(OR')_3$ with silanes of the formula $Si(OR')_4$ and/or $R_2$—$Si(OR')_2$, wherein R represents a substituted or unsubstituted alkyl group having 1 to 7 carbon atoms, and R' represents an alkyl group with 1 to 4 carbon atoms. The silsesquioxane polymers can be neutral or anionic. In one aspect, the silsesquioxanes disclosed in U.S. Pat. No. 4,781,844 (Kortmann, et al.), U.S. Pat. No. 4,351,736 (Steinberger et al.), U.S. Pat. No. 5,073,442 (Knowlton et al.) or U.S. Pat. No. 3,493,424 (Mohrlok et al.), each of which are incorporated herein by reference, can be used herein.

The silsesquioxane can be prepared by adding a silane to a mixture of water in the presence of a buffer and/or a surfactant, while agitating the mixture under acidic or basic conditions. Depending upon the selection of the silane, alcohol produced during the production of the silsesquioxane can be removed by techniques known in the art such as, for example, distillation. In one aspect, silanes useful in making the silsesquioxane include, but are not limited to, methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, and 2-ethylbutoxytriethoxysilane. The amount of silsesquioxane used in the compositions described herein can vary, which will be described in detail below.

The wax component is not limited and known wax components can be used. Examples of waxes useful herein include, but are not limited to, vegetable waxes such as carnauba wax, haze wax, ouricury wax and esparto wax; animal waxes such as bees wax, insect wax, shellac wax and spermaceti wax; petroleum waxes such as paraffin wax, micro crystal wax, polyethylene wax, ester wax and oxidized wax; mineral waxes such as montan wax, ozokerite and ceresine; modified wax, glyceride, synthetic ketone amine amide, hydrogenated wax, or any combination thereof.

In other aspects, the wax component is a higher fatty acid such as palmitic acid, stearic acid, margaric acid and behenic acid; higher alcohols such as palmityl alcohol, stearyl alcohol, behenyl alcohol, margaryl alcohol, myricyl alcohol and eicosanol; higher fatty acid esters such as cetyl palmitate, myricyl palmitate, cetyl stearate and myricyl stearate; amides such as acetamide, propionic acid amide, palmitic acid amide, stearic acid amide and amide wax; higher fatty amines such as stearylamine, behenylamine and palmitylamine, or any combination thereof.

In one aspect, the wax comprises paraffin wax, candellila wax, and a polyoxyalkylene such as polyethylene oxide (e,g,. Carbowax 400).

The compositions described herein also include one or more surfactants. In one aspect, the surfactant is anionic, cationic, or neutral. Not wishing to be bound by theory, the surfactant prevents phase separation between the silsesquioxane and wax components. In the case when two or more surfactants are used to produce the composition, the surfactants are selected such that the silsesquioxane and wax components are compatible with one another (i.e., do not form separate phases when mixed). The selection of the surfactant will vary depending upon the nature of the silsesquioxane and wax. For example, when the silsesquioxane is anionic and the wax is anionic, one or more anionic surfactants can be used to produce a compatible solution of the silsesquioxane and wax. Other examples of combinations of surfactants include nonionic/nonionic, nonionic/anionic, cationic/cationic, and cationic/nonionic.

Useful anionic surfactants include, but are not limited to, alkali metal and (alkyl)ammonium salts of: 1) alkyl sulfates and sulfonates such as sodium dodecyl sulfate, sodium 2-ethylhexyl sulfate, and potassium dodecanesulfonate; 2) sulfates of polyethoxylated derivatives of straight or branched chain aliphatic alcohols and carboxylic acids; 3) alkylbenzene or alkylnaphthalene sulfonates and sulfates such as sodium laurylbenzene-4-sulfonate and ethoxylated and polyethoxylated alkyl and aralkyl alcohol carboxylates; 5) glycinates such as alkyl sarcosinates and alkyl glycinates; 6) sulfosuccinates including dialkyl sulfosuccinates; 7) isothionate derivatives; 8) N-acyltaurine derivatives such as sodium N methyl-N-oleyltaurate); 9) amine oxides including alkyl and alkylamidoalkyldialkylamine oxides; and 10) alkyl phosphate mono or di-esters such as ethoxylated dodecyl alcohol phosphate ester, sodium salt.

Representative commercial examples of suitable anionic sulfonate surfactants include, for example, sodium lauryl sulfate, available as TEXAPON™ L-100 from Henkel Inc., Wilmington, Del., or as POLYSTEP™ B-3 from Stepan Chemical Co, Northfield, Ill.; sodium 25 lauryl ether sulfate, available as POLYSTEP™ B-12 from Stepan Chemical Co., Northfield, Ill.; ammonium lauryl sulfate, available as STANDAPOL™ A from Henkel Inc., Wilmington, Del.; and sodium dodecyl benzene sulfonate, available as SIPONATE™ DS-10 from Rhone-Poulenc, Inc., Cranberry, N.J., dialkyl sulfosuccinates, having the tradename AEROSOL™ OT, commercially available from Cytec Industries, West Paterson, N.J.; sodium methyl taurate (available under the trade designation NIKKOL™ CMT30 from Nikko Chemicals Co., Tokyo, Japan); secondary alkane sulfonates such as Hostapur™ SAS which is a Sodium (C14-C17) secondary alkane sulfonates (alpha-olefin sulfonates) available from Clariant Corp., Charlotte, N.C.; methyl-2-sulfoalkyl esters such as sodium methyl-2-sulfo(C12-16)ester and disodium 2-sulfo(C12-C16) fatty acid available from Stepan Company under the trade designation ALPHASTE™ PC48; alkylsulfoacetates and alkylsulfosuccinates available as sodium laurylsulfoacetate (under the trade designation LANTHANOL™ LAL) and disodiumlaurethsulfosuccinate (STEPANMILD™ SL3), both from Stepan Company; alkylsulfates such as ammoniumlauryl sulfate commercially available under the trade designation STEPANOL™ AM from Stepan Company, and or dodecylbenzenesulfonic acid sold under BIO-SOFT® AS-100 from Stepan Chemical Co. In one aspect, the surfactant can be a disodium alpha olefin sulfonate, which contains a mixture of $C_{12}$ to $C_{16}$ sulfonates. In one aspect, CALSOFT™ AOS-40 manufactured by Pilot Corp. can be used herein as the surfactant. In another aspect, the surfactant is DOWFAX 2A1 or 2G manufactured by Dow Chemical, which are alkyl diphenyl oxide disulfonates.

Representative commercial examples of suitable anionic phosphate surfactants include a mixture of mono-, di- and tri-(alkyltetraglycolether)-o-phosphoric acid esters generally referred to as trilaureth-4-phosphate commercially available under the trade designation HOSTAPHAT™ 340KL from Clariant Corp., as well as PPG-5 cetyl 10 phosphate available under the trade designation CRODAPHOS™ SG from Croda Inc., Parsipanny, N.J.

Representative commercial examples of suitable anionic amine oxide surfactants those commercially available under the trade designations AMMONYX™ LO, LMDO, and CO, which are lauryldimethylamine oxide, laurylamidopropyldimethylamine oxide, and cetyl amine oxide, all from Stepan Company.

In the case of nonionic surfactants, in one aspect, the nonionic surfactants include the condensation products of a higher aliphatic alcohol, such as a fatty alcohol, containing about 8 to about 20 carbon atoms, in a straight or branched chain configuration, condensed with about 3 to about 100 moles, preferably about 5 to about 40 moles, most preferably about 5 to about 20 moles of ethylene oxide. Examples of such nonionic ethoxylated fatty alcohol surfactants are the Tergitol™ 15-S series from Union Carbide and Brij™ surfactants from ICI. Tergitol™ 15-S Surfactants include $C_{11}$-$C_{15}$ secondary alcohol polyethyleneglycol ethers. Brij™ 97 surfactant is Polyoxyethylene(10) oleyl ether; Brij™ 58 surfactant is polyoxyethylene(20) cetyl ether; and Brij™ 76 surfactant is polyoxyethylene(10) stearyl ether.

Another useful class of nonionic surfactants include the polyethylene oxide condensates of one mole of alkyl phenol containing from about 6 to 12 carbon atoms in a straight or branched chain configuration, with about 3 to about 100 moles, preferably about 5 to about 40 moles, most preferably about 5 to about 20 moles of ethylene oxide to achieve the above defined HLB. Examples of nonreactive nonionic surfactants are the Igepal™ CO and CA series from Rhone-Poulenc. Igepal™ CO surfactants include nonylphenoxy poly (ethyleneoxy)ethanols. Igepal™ CA surfactants include octylphenoxy poly(ethyleneoxy)ethanols.

Another useful class of hydrocarbon nonionic surfactants include block copolymers of ethylene oxide and propylene oxide or butylene oxide with HLB values of about 6 to about 19, preferably about 9 to about 18, and most preferably about 10 to about 16. Examples of such nonionic block copolymer surfactants are the Pluronic™ and Tetronic™ series of surfactants from BASF. Pluronic™ surfactants include ethylene oxide-propylene oxide block copolymers. Tetronic™ surfactants include ethylene oxide-propylene oxide block copolymers.

In other aspects, the nonionic surfactants include sorbitan fatty acid esters, polyoxyethylene sorbitan fatty acid esters and polyoxyethylene stearates having HLBs of about 6 to about 19, about 9 to about 18, and about 10 to about 16. Examples of such fatty acid ester nonionic surfactants are the Span™, Tween™, and Myj™ surfactants from ICI. Span™ surfactants include $C_{12}$-$C_{18}$ sorbitan monoesters. Tween™ surfactants include poly(ethylene oxide) $C_{12}$-$C_{18}$ sorbitan monoesters. Myj™ surfactants include poly(ethylene oxide) stearates.

In one aspect, the nonionic surfactant can include polyoxyethylene alkyl ethers, polyoxyethylene alkyl-phenyl ethers, polyoxyethylene acyl esters, sorbitan fatty acid esters, polyoxyethylene alkylamines, polyoxyethylene alkylamides, polyoxyethylene lauryl ether, polyoxyethylene cetyl ether, polyoxyethylene stearyl ether, polyoxyethylene oleyl ether, polyoxyethylene octylphenyl ether, polyoxyethylene nonylphenyl ether, polyethylene glycol laurate, polyethylene glycol stearate, polyethylene glycol distearate, polyethylene glycol oleate, oxyethylene-oxypropylene block copolymer, sorbitan laurate, sorbitan stearate, sorbitan distearate, sorbitan oleate, sorbitan sesquioleate, sorbitan trioleate, polyoxyethylene sorbitan laurate, polyoxyethylene sorbitan stearate, polyoxyethylene sorbitan oleate, polyoxyethylene laurylamine, polyoxyethylene laurylamide, laurylamine acetate, hard beef tallow propylenediamine dioleate, ethoxylated tetramethyldecynediol, fluoroaliphatic polymeric ester, polyether-polysiloxane copolymer, and the like.

Although the compositions described herein do not require the use of a fluoropolymer, in certain aspects the compositions can include one or more fluoropolymers. In one aspect, the fluoropolymer is a fluorinated polyurethane. The fluorinated polyurethane is generally the reaction product between a diisocyanate and a perfluoropolyether having at least two hydroxyl groups. The diisocyanate can be an aliphatic, cycloaliphatic, or aromatic, compound. Examples of diisocyanates include, but are not limited to, hexamethylenediisocyanate (HDI), trimethylhexamethylenediisocyanate, isophorone diisocyanate (IPDI), 4,4'-methylenebis (cyclohexylisocyanate) (H12-MDI), cyclohexyl-1,4-diisocyanate, 4,4'-methylenebis(phenyl)socyanate) (MDI) or its isomers, toluene 2,4-diisocyanate (TDI) or its isomers, xylylene diisocyanate, naphthalene-1,5-diisocyanate, p-phenylendiisocyanate, and tetramethyl-xylylenediisocyanate (TMXDI).

With respect to the perfluoropolyether, in certain aspects it is end-capped with hydroxyl groups such that they can react with an isocyanate group to produce the corresponding urethane. The perfluoropolyether can be composed of a variety of different repeat units including, but not limited to $(C_3F_6O)$, $(CF_2CF_2O)$, $(CF(CF_3)O)$, $(CF_2O)$ $(CF_2(CF^2)_{x'}CF_2O)$ wherein x' is an integer equal to 1 or 2, or $(CF_2CF_2CH_2O)$. The molecular weight of the perfluoropolyether can also vary.

In one aspect, the molecular weight of the perfluoropolyether is less than 5,000. In other aspects, the molecular weight is from 500, to 4,000, from 1,000 to 3,000, from 1,000 to 2,000, or about 1,500. In one aspect, the perfluoropolyether is a fluorinated propyl ether, which is referred to in the art at times as "C3." In certain aspects, it is desirable that the perfluoropolyether not contain higher molecule weight derivatives such as fluorinated octyl ethers (C8) and analogs thereof, as these compounds pose environmental and health risks.

In certain aspects, the fluorinated polyurethane can have at least one ionizable group. Ionizable groups are classified as either cationic or anionic. Cationic ionizable groups are functional groups that when protonated form a positively charged group. Examples of such groups include amines, where protonation of the amine produces a positively charged quaternary ammonium group. Conversely, anionic ionizable groups are groups that possess one or more hydrogen atoms that can be deprotonated to produce negatively charged groups. Examples of such groups include carboxylic acids, where deprotonation of the acid produces a negatively charged carboxyl group. The ionizable groups can be incorporated into the fluorinated polyurethane using a variety of synthetic techniques. In one aspect, the ionizable group is present on the perfluoropolyether, which is then subsequently reacted with the diisocyanate. In other aspects, a diol having an ionizable group can be added to the reaction mixture of perfluoropolyether and diisocyanate. In this aspect, the diol is a monomer that is polymerized during the reaction. The cationic and anionic fluorinated polyurethanes and methods for making the same disclosed in U.S. Pat. No. 7,015,278 and U.S. Published Application No. 2005/0164010 can be used herein, the teachings of which are incorporated by reference in their entireties. In one aspect, the fluorinated polyurethane is Fluorolink® P56 manufactured by Solvay Solexis, which is a water dispersion of an anionic polyurethane with a perfluoropolyether backbone. In another aspect, the fluorinated polyurethane is to Fluorolink® 5032 manufactured by Solvay Solexis, which is a water dispersion of a cationic polyurethane with a perfluoropolyether backbone.

In certain aspects, a single fluorinated polyurethane can have both cationic and anionic ionizable groups present on the polymer. In other aspects, the fluorinated polyurethane can be a mixture of polyurethanes, where the mixture is composed of a cationic fluorinated polyurethane (e.g., Fluorolink® 5032) and an anionic fluorinated polyurethane (e.g., Fluorolink® P56).

The compositions described herein can include other components such as, for example, preservatives or antimicrobial agents. As will be discussed below, separate compositions composed of the silsesquioxane and wax can be prepared and stored for extended periods of time prior to mixing with the aid of preservatives and antimicrobial agents. In other aspects, the compositions can also include rheology modifiers and foaming agents.

Any of the compositions described herein can be produced by admixing the silsesquioxane, wax, and one or more surfactants in water. The term "admixing" is defined as the mixing of two or more components together so that there is no chemical reaction or physical interaction. The term "admixing" also includes the chemical reaction or physical interaction between any of the components described herein upon mixing to produce the composition. The components can be admixed in water alone or in combination with one or more other solvents.

In one aspect, the compositions described herein are produced by admixing in water (a) a first aqueous composition comprising a silsesquioxane and a first surfactant and (b) a second aqueous composition comprising a wax and a second surfactant. In one aspect, the silsesquioxane composition is produced by first adding the surfactant to water followed by the addition of a silane to produce the silsesquioxane in situ. Exemplary methods for making the silsesquioxane composition are provided in the Examples. The amount of silsesquioxane present in the first composition can vary. In one aspect, the amount of silsesquioxane present in the first composition is from 1% to 30% by weight, 5% to 25% by weight, or 10% to 20% by weight of the first composition.

Similar to the preparation of the silsesquioxane composition, the wax composition (i.e., second composition) can be prepared using techniques known in the art. Exemplary methods for making the wax composition are provided in the Examples. In one aspect, the total amount of wax present in the second composition is from 1% to 40% by weight, 5% to 35% by weight, 10% to 30% by weight, or 15% to 25% by weight of the second composition.

The first and second compositions prior to application to the fiber are mixed with one another to produce the final composition. The first and second compositions can be admixed using techniques described in the art. For example, mixers such as paddle mixers, drum mixers, auger mixers and the like can be used. The first and second compositions can be admixed at room temperature without special handling to provide the final composition. The final composition is generally a dispersion.

The amount of first and second composition used to make the final composition can vary. In one aspect, the first composition is from 1% to 20% by weight, 5% to 10% by weight, 6% to 9% by weight, 7% to 8% by weight, or about 7.5% by weight of the final composition. In another aspect, the second composition is from 0.1% to 10% by weight, 0.5% to 5% by weight, 1% to 3% by weight, 1% to 2% by weight, or about 1.5% by weight of the final composition.

In one aspect, the first and second compositions can be used as kits. As discussed above, the first and second compositions are independently stable and can be stored for extended periods of time. Thus, the compositions can be shipped to any site and mixed prior to being applied to the fibers or articles. In the alternative, the kits permit the sequential application of the first and second composition to the fibers. For example, the first composition (i.e., silsesquioxane) can be applied to the fibers first followed by the application of the second composition (i.e., wax). Alternatively, the second composition can be applied first followed by the application of the first composition. Finally, as discussed above, compositions containing both the silsesquioxane and wax can be applied simultaneously to the fibers.

Any of the compositions described herein can be applied to an article using techniques known in the art. The method for contacting the article with the composition will vary depending upon the article and the form of the composition. In one aspect, the compositions described herein can be in the form of an aqueous medium or a dispersion, such as a foam. Alternatively, the compositions described herein can be dissolved or dispersed in an organic solvent such as, for example, a glycol or polyether, or an to aqueous organic solvent. In this aspect, the composition can be applied to the article by spray application. In another aspect, other methods such as, for example, Beck application, Continuous Liquid and Foam application, Flood, Flex Nip, Pad, and Superba (saturated steam continuous heat setting) applications can be used to contact the article with the composition.

In another aspect, when the contacting step involves topical coating, the coating step can be performed by spray, foam, kiss or liquid injection methods and various methods thereof followed by drying in a hot air or radiant heat oven at 160 to 320° F. for a time sufficient to dry the article. In one aspect, a spray application can be applied in a liquid medium (water and chemical treatment) with a wet pickup of 5% to about 200% followed by drying. In another aspect, a foam application can be applied in a liquid medium (water and chemical treatment) with a wet pickup of 5% to about 200%. In this aspect, the foam can be applied by a direct puddle application with a press roll, an injection manifold and/or a sub-surface extraction device. Subsequent drying in a hot air or radiant heat oven at 160 to 320° F. for a time sufficient to dry the article should follow.

The prevailing plant conditions will also affect the amount of composition to be applied to the article to achieve the desired odor resistance. The composition of the article will also influence the amount of composition to be applied.

Application conditions such as pH, temperature, steam and drying time can vary. As would be recognized by one of ordinary skill in the art, the amount of pH adjustment needed prior to use of the compositions will depend on the amount of each component in the composition. Further, pH adjustment of the composition prior to use can be by methods known to one of ordinary skill in the art, such as the addition of acid or base, as appropriate. In one aspect, once the article has been contacted with the composition, the article can be further treated to remove any composition that is not bound to the article.

The temperature at which the article is contacted by the compositions described herein range from ambient to temperatures up to 100° C. at atmospheric pressure and above 100° C. under pressure conditions (closed atmosphere). Still further, the temperature of application can be from 25, 35, 45, 55, 65, 75, 85 or 100° C., where any value can form an upper or a lower end point, as appropriate. In another aspect, the composition can be cured at ambient temperature once applied to the substrate.

Where production procedures warrant, steam can aid in the efficacy of the compositions herein when applied by, but not limited to Beck, Continuous liquid, Flood, Flex Nip, Superba, and Pad applications. The steam time can vary from about 15 seconds to about 10 minutes, or from about 2 minutes to about 8 minutes. Still further, the application time can be from about 15 seconds or 1, 2, 3, 4, 5, 6, 7, 8, 9 or 10 minutes, where any value can form an upper or a lower end point, as appropriate. In certain applications, but not limited to Spray Application and Foam Application, drying with forced heat can aid in the fixing of the composition to the article. In one aspect, the coated article can be dried with forced air. In another aspect, the coated article can be dried with microwave heat. The drying time is generally dependent upon varying conditions predicated by moisture content, range speed, type construction, the weight of the substrate, etc. The drying time can vary from 30 seconds to 15 minutes. Still further, the drying time can be from 15 seconds or 1, 3, 5, 7, 9, 10, 12, or 15 minutes, where any value can be used as an upper or lower endpoint, as appropriate.

In one aspect, the weight ratio of the compositions described herein can vary between 0.5% to 600% of wet pick up where such amount is based on the weight of the article and the composition that is used. The weight ratio will vary dependent on the manner of application. In one aspect, the owf ("on weight fiber") amount of silsesquioxane applied to the fiber is 0.5% to 3% owf, 0.75% to 2.5% owf, or 1% to 2% owf. In another aspect, the owf ("on weight fiber") amount of wax applied to the fiber is 0.1% to 1% owf, 0.1% to 0.5% owf, or 0.3% to 0.5% owf. In one aspect, when the fiber is nylon, the amount of wax applied to the fiber is about 0.3% owf. In another aspect, when the fiber is polyester, the amount of wax applied to the fiber is about 0.5% owf.

Not wishing to be bound by theory, if excess wax is present, the dry soil resistance of the fiber diminishes. Thus, lower amounts of silsesquioxane and wax are needed to advantageously impart water repellency and dry soil resistance to the fibers. Moreover, fibers treated with the compositions described herein are very durable. As shown in the Examples, carpet fibers treated with the compositions described herein are durable even when exposed to hot water extraction. Finally, the compositions described herein provide an attractive alternative to fluoropolymers with respect to imparting dry to soil release to fibers.

Also contemplated are articles treated with any of the compositions described herein. In one aspect, the article can be composed of any material that can receive and that will adhere to the composition where water repellency and dry soil resistance is desirable. Examples of articles include, but are not limited to, bedding (e.g., blankets, sheets, pillowcases, futon or comforter covers, comforter wadding), clothes (e.g., suits, uniforms, shirts, blouses, trousers, skirts, sweaters, socks, panty hoses, shoe linings, shoe sole inserts), curtains, and carpet.

In one aspect, the article is composed of natural and/or synthetic fibers. In one aspect, the synthetic fiber includes, but is not limited to, polyamide fibers (e.g., nylons), polyester fibers, polypropylene fibers, synthetic fibers containing free amino groups, and derivatives thereof such as nylon covered with polypropylene. Fibers containing free amino groups can be obtained by a variety of methods, including, but not limited to, the condensation reaction of hexamethylenediamine with adipic acid, hexamethylenediamine with sebacic acid, ξ-aminodecanoic acid, caprolactam and dodecylcaprolactam. Fibers formed from polyaryl amides, including type 6 and type 6,6 nylons, can be treated by the compositions and methods described herein. Examples of natural fibers include, but are not limited to, cotton, wool, and flax. Semisynthetic fibers such as rayon can also be contacted with any of the compositions described herein. In one aspect, the fibers are Dupont's Antron®, Sorona® yarn manufactured by Dupont, and Corterra® (polytrimethylene terephthalate) manufactured by Shell Chemicals.

The fibers treated with the compositions and methods described herein can be twisted, woven, tufted and sewn into various forms of textile materials including, but not limited to, rugs, carpets, and yarns. The fibers can be treated and then formed into the various forms of textile materials, or the formed textile can be treated.

EXAMPLES

The following examples are put forth so as to provide those of ordinary skill in the art with a complete disclosure and description of how the compositions and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

A. Preparation of Silsesquioxane Composition

The components used to prepare the silsesquioxane composition are provided in Table 1. The following procedure was used to prepare the composition.

1. Charge dodecylbenzyl sulfuric acid (DDBSA) and water. Mix until DDBSA is dissolved.
2. Start a nitrogen blanket. Run on full for 30 seconds and then change to 1 scfm. Nitrogen should be present in tank at all times.
3. Charge solution with aqua ammonia.
4. For a 20,000 lb batch, methyl trimethoxy silane addition rate was 5 lb/min (2.5 lb/min at two different addition points).
5. Sample after each drum is charged to check turbidity. Appearance should be clear to clear blue.
6. After all silane is charged mix for 1 hour.
7. After charging silane, charge 5 gallons of methanol through pump and lines to clear out the silane.
8. Set up to receive methanol/water distillate. Begin heating to 97-99° C.
9. After temperature is reached sample every 2 hours for % solids. Solids should be 9-11%.
10. Once in-process solids are in spec begin cooling to less than 30° C.
11. Charge with preservative.
12. When 30° C. or below, sample to lab for pH adjustment with ammonia. (pH=6.5-7.5).
13. Drum product through 5 micron filter bag.

TABLE 1

| COMPONENT | % |
|---|---|
| Water | 86.365% |
| DDBSA | 0.635% |
| Methyl trimethoxysilane | 12.700% |
| Water/Methanol Distillate | −24.000% |
| Aqua Ammonia | 0.200% |
| Preservative | 0.100% |

B. Preparation of Wax Composition

The components used to prepare the wax composition are provided in Table 2. The following procedure was used to prepare the composition.

1. Charge paraffin wax and heat to melt (around 91° C.).
2. Add in increments, candelilla wax to the melt. Allow the wax to melt while adding, then agitate the wax.
3. Add oleic acid and adjust temperature to 91-92° C.
4. To a second kettle, charge water, Tauranol MS, Triethanolamine. Heat to 91-92° C.
5. With both kettles at a temperature of 91-92° C., charge the water mix to the wax melt slowly and with good agitation. Maintain a temperature of 91-92° C.
6. After addition is complete, hold at 91-92° C. for 15 minutes.
7. Homogenize into cooling kettle containing water and Carbowax 400. Homogenize at 1000 psi 2nd stage and 3000 psi 1st stage. Apply cooling on receiver prior to beginning homogenization. Agitation should be applied soon on the receiver in order to minimize splash and foaming Leave agitation on coarse emulsion. Maintain coarse emulsion at 91-92° C. After homogenization, dump any unhomogenized product from incoming line and homogenizer. Blow any product from the output line into the receiver.
8. Cool wax composition to 32° C.

TABLE 2

| COMPONENTS | % |
|---|---|
| PARAFFIN WAX | 14.21 |
| CANDELILLA WAX | 5.29 |
| OLEIC ACID | 2.27 |
| WATER | 37.27 |
| TAURANOL MS | 1.09 |
| TRIETHANOLAMINE | 2.35 |
| WATER | 37.27 |
| CARBOWAX 400 | 0.25 |

C. Preparation of Silsesquioxane/Wax Composition

A mixing tank was filled with a specific amount of water. Next, the silsesquioxane composition from (A) was added to the tank followed by the addition of the wax composition (B). Alternatively, the wax composition can be added first followed by the addition of the silsesquioxane composition. The composition is then mixed at room temperature to produce a white, milky dispersion. The amount of silsesquioxane and wax compositions produced a final composition having approximately 7.5% by weight silsesquioxane composition and 1.5% by weight wax composition.

D. Application of Silsesquioxane/Wax Composition to Carpet

The silsesquioxane composition alone provided outstanding dry soil release. The silsesquioxane composition was applied topically onto carpets made of nylon (6 & 6.6), polyester (PET), Triexta (PTT Dupont Sorona polymer) and polypropylene. Application amounts range from 1% owf to 2.5% owf. The 1.5% owf application produced the required results and additional application work was done at this level. The 1.5% owf level yields excellent dry soil release results. The silsesquioxane composition yielded some water repellency on nylon (8 to 10 seconds) but very little repellency on the other fabrics (2 to 3 seconds). Additionally, over a period of several days the silsesquioxane composition thickened to the point that it was not useable.

When the wax composition described above was combined with the silsesquioxane composition, the water repellency at the desired level could be achieved. The mixing of the wax and silsesquioxane compositions resulted in the formulated product separating over a period of time. To avoid this problem, the wax and silsesquioxane compositions were prepared individually as discussed above and mixed together prior to the application to the carpet. It was determined that the required water repellency levels could be achieved by using 0.3% owf of the wax composition on nylon and 0.5% owf on the polyester, Triexta, and polypropylene fabrics. The repellency was timed at 2+ mins. on each fabric. Larger amounts will increase the repellency rate, which may be considered later if repellency requirements increase.

Target application amounts were 1.5% owf of silsesquioxane composition and 0.3% owf of wax composition on nylon, while 1.5% owf of silsesquioxane composition and 0.5% owf of wax composition was applied to the other fabrics. Application work on carpet was performed by topical spray and topical foam application at 20% owg wet pick up and dry cured. Additional application work was done by exhaust method, 300% wet pick up with pH adjustment to 7.0 pH using acetic acid, steamed for 2 minutes and dried.

The exhaust application had less effect on the dry soil release and no improvement on water repellency. If the exhaust method of applying the silsesquioxane composition is used, the wax composition should be topically applied. The best dry soil release and repellency was achieved by the topical application methods of spray or foam.

The treated carpet had superior dry soil release while the untreated carpet had extreme soiling. To check the durability of the silsesquioxane, a sample of treated carpet was exposed to 5 hot water extractions and then exposed to accelerated dry soil testing. The accelerated dry soil testing showed only slightly more soil deposit than the original treated sample after exposure to the 5 hot water extractions. Finally, the application of the silsesquioxane and wax compositions did not have an adverse effect on lightfastness (AATCC 16E), oxides of nitrogen (AATCC 164), colorfastness to ozone (AATCC 129), flammability pill testing, or flammability radiant panel testing.

The ability of the compositions described herein to repel oil was also evaluated. 1.5% owg of the silsesquioxane composition produced in section (A) and 0.5% owg of the wax composition produced in section (B) was applied to polyester, Triexta, and polypropylene carpets. The evaluation for oil repellency used the standard "oily C" solution. (Standard test oil for checking oil repellency on carpet) The oil repellency on all the above fabrics was 2+ minutes. The standard for oil repellency on carpet is that 2 of 3 drops of oil must stand on the carpet surface for 10 seconds. In another set of experiments, 1.5% owg of the silsesquioxane composition and 0.3% owg wax composition was applied to both nylon type 6 and nylon type 6.6 fibers and testing for oil repellency was done. The oil repellency on all fabrics was 2+ minutes.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed:

1. A composition for imparting liquid repellency and dry soil resistance to a fiber, the composition comprising (a) a silsesquioxane, (b) a wax, (c) a surfactant, and (b) water, wherein the composition is made by the process comprising admixing in water (a) a first aqueous composition comprising a silsesquioxane and a first surfactant and (b) a second aqueous composition comprising a wax and a second surfactant, and wherein the first aqueous composition is from 1% to 20% by weight of the composition and the second aqueous composition is from 0.1% to 10% by weight of the composition.

2. The composition of claim 1, wherein the silsesquioxane comprises a polymer comprising a condensation product of R—Si(OR')$_3$, wherein R is a substituted or unsubstituted alkyl group having 1 to 7 carbon atoms, and R' is an alkyl group having 1 to 4 carbon atoms.

3. The composition of claim 1, wherein the silsesquioxane comprises a polymer comprising a condensation product of methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, 2-ethylbutoxytriethoxysilane, or any combination thereof.

4. The composition of claim 1, wherein the wax comprises a natural wax, a synthetic wax, or a combination thereof.

5. The composition of claim 1, wherein the wax comprises a vegetable wax, an animal wax, a mineral wax, a petroleum wax, a polyoxyalkylene, or any combination thereof.

6. The composition of claim 1, wherein the wax comprises a mixture of paraffin wax, candellila wax, and a polyoxyalkylene.

7. The composition of claim 1, wherein the surfactant is a single surfactant.

8. The composition of claim 1, wherein the surfactant comprises two or more surfactants, wherein the surfactants are not a mixture of a cationic surfactant and an anionic surfactant.

9. The composition of claim 1, wherein the surfactant comprises two or more anionic surfactants.

10. The composition of claim 1, wherein the composition further comprises a preservative or antimicrobial agent.

11. The composition of claim 1, wherein the first surfactant and the second surfactant are anionic surfactants.

12. The composition of claim 1, wherein the first aqueous composition is from 5% to 10% by weight of the composition and the second aqueous composition is from 1% to 3% by weight of the composition.

13. The composition of claim 1, wherein the silsesquioxane is from 5% to 30% by weight of the first aqueous composition.

14. The composition of claim 1, wherein the wax is from 5% to 40% by weight of the second aqueous composition.

15. The composition of claim 1, wherein (a) the silsesquioxane comprises the condensation product of methyltrimethoxysilane and the first surfactant comprises dodecylbenzenesulfonic acid and (b) the wax comprises paraffin wax, candellila wax, and a polyoxyalkylene, and the second surfactant comprises a salt of oleic acid.

16. A method for imparting liquid repellency and dry soil resistance to a fiber, comprising contacting the fiber with the composition of claim 1.

17. The method of claim 16, wherein the fiber is used to make a rug, carpet, yarn, bedding, clothes, or curtains.

18. The method of claim 16, wherein the composition is applied topically to the fiber.

19. The method of claim 16, wherein the amount of silsesquioxane applied to the fiber is 0.5% to 3% on weight fiber and the amount of wax applied to the fiber is 0.1% to 1% on weight fiber.

20. An article comprising the composition of claim 1, wherein the composition is applied to the article.

21. A kit comprising (a) a first aqueous composition comprising a silsesquioxane and a first surfactant and (b) a second aqueous composition comprising a wax and a second surfactant, wherein the first aqueous composition comprises a silsesquioxane and a first surfactant and the second aqueous composition comprises a wax and a second surfactant, and wherein the first aqueous composition is from 1% to 20% by weight of the composition and the second aqueous composition is from 0.1% to 10% by weight of the composition.

22. A composition for imparting liquid repellency and dry soil resistance to a fiber, the composition comprising (a) a silsesquioxane, (b) a wax comprising a mixture of paraffin wax, candellila wax, and a polyoxyalkylene, (c) a surfactant, and (b) water.

23. A method for imparting liquid repellency and dry soil resistance to a fiber, comprising contacting the fiber with the composition of claim 22.

24. An article comprising the composition of claim 22, wherein the composition is applied to the article.

* * * * *